(12) United States Patent
Akutsu et al.

(10) Patent No.: US 9,604,552 B2
(45) Date of Patent: Mar. 28, 2017

(54) SEAT FOR VEHICLES

(71) Applicants: TS TECH CO., LTD., Asaka-shi, Saitama (JP); HONDA MOTOR CO., LTD., Tokyo (JP)

(72) Inventors: Takeshi Akutsu, Tochigi (JP); Koki Sato, Saitama (JP); Mitsumasa Nakamura, Saitama (JP); Maki Yamaguchi, Saitama (JP)

(73) Assignees: TS Tech Co., Ltd., Saitama (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/783,161

(22) PCT Filed: Mar. 18, 2014

(86) PCT No.: PCT/JP2014/057330
§ 371 (c)(1),
(2) Date: Oct. 8, 2015

(87) PCT Pub. No.: WO2014/167956
PCT Pub. Date: Oct. 16, 2014

(65) Prior Publication Data
US 2016/0052425 A1 Feb. 25, 2016

(30) Foreign Application Priority Data

Apr. 12, 2013 (JP) .................................. 2013-084288
Apr. 12, 2013 (JP) .................................. 2013-084289

(51) Int. Cl.
*B60N 2/20* (2006.01)
*B60N 2/30* (2006.01)
*B60N 2/06* (2006.01)

(52) U.S. Cl.
CPC ............... *B60N 2/206* (2013.01); *B60N 2/06* (2013.01); *B60N 2/3013* (2013.01); *B60N 2/3047* (2013.01); *B60N 2/3065* (2013.01)

(58) Field of Classification Search
CPC . B60N 2/02; B60N 2/04; B60N 2/206; B60N 2/30; B60N 2/3004; B60N 2/3009;
(Continued)

(56) References Cited

U.S. PATENT DOCUMENTS 7,100,984 B2 * 9/2006 Epaud ...................... B60N 2/06
297/341
2004/0032155 A1 * 2/2004 Yamada ............... B60N 2/3009
297/331
(Continued)

FOREIGN PATENT DOCUMENTS

EP 2 000 353 A2 12/2008
FR 2 851 211 A1 8/2004
(Continued)

OTHER PUBLICATIONS

Office Action issued for JP 2013-084288 (Sep. 1, 2015).
(Continued)

*Primary Examiner* — Jason S Daniels
(74) *Attorney, Agent, or Firm* — Drinker Biddle & Reath LLP

(57) ABSTRACT

A vehicle seat which can retract a seat body in a refraction floor with components of a refraction structure not arranged on a surface of the retraction floor is provided by a simple structure. This includes: a support leg detachably retained by a leg retaining member, located on a vehicle body floor, and supporting a seat cushion; and a support base connected to the vehicle body floor to support a pivotable seat back. The seat back pivots relative to the support base to move the seat cushion to the refraction floor. The support leg pivots
(Continued)

relative to the seat cushion in accordance with a pivotal movement of the seat back and reaches from the leg retaining member when the seat back has reached a predetermined pivoted position. The support leg is positioned lower than the leg retaining member when the vehicle seat is in a retracted state.

9 Claims, 6 Drawing Sheets

(58) Field of Classification Search
CPC .. B60N 2/3013; B60N 2/3047; B60N 2/3065; B60N 2/3072; B60N 2/3075
USPC ................................ 296/65.05, 65.09, 65.16
See application file for complete search history.

(56) References Cited

U.S. PATENT DOCUMENTS

| | | | |
|---|---|---|---|
| 2004/0056521 A1* | 3/2004 | Kayumi | B60N 2/01 297/334 |
| 2004/0100117 A1 | 5/2004 | Rhodes et al. | |
| 2004/0212237 A1 | 10/2004 | Epaud et al. | |
| 2009/0295185 A1* | 12/2009 | Abe | B60N 2/3013 296/65.09 |
| 2011/0204670 A1* | 8/2011 | Abe | B60N 2/3013 296/65.09 |

FOREIGN PATENT DOCUMENTS

| | | | |
|---|---|---|---|
| FR | 2963289 A1 * | 2/2012 | ............... B60N 2/24 |
| JP | 09-315189 A | 12/1997 | |
| JP | 2007-176404 A | 7/2007 | |
| JP | 2008-030657 A | 2/2008 | |
| JP | 2009-067234 A | 4/2009 | |
| JP | 2009-067309 A | 4/2009 | |
| WO | 2008/015527 A1 | 2/2008 | |
| WO | WO 2009/104586 A1 | 8/2009 | |

OTHER PUBLICATIONS

Office Action issued for JP 2013-084289 (Feb. 3, 2015).
Extended European Search Report issued for related application EP 14782393.4, Mar. 23, 2016, 7 pages.

* cited by examiner

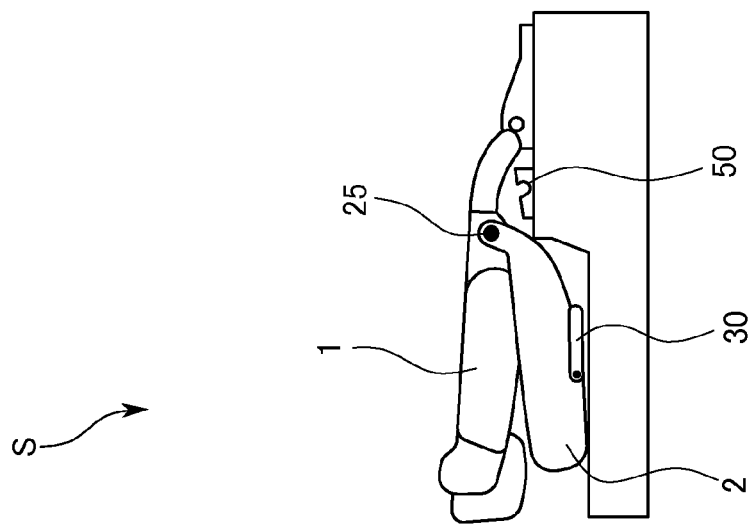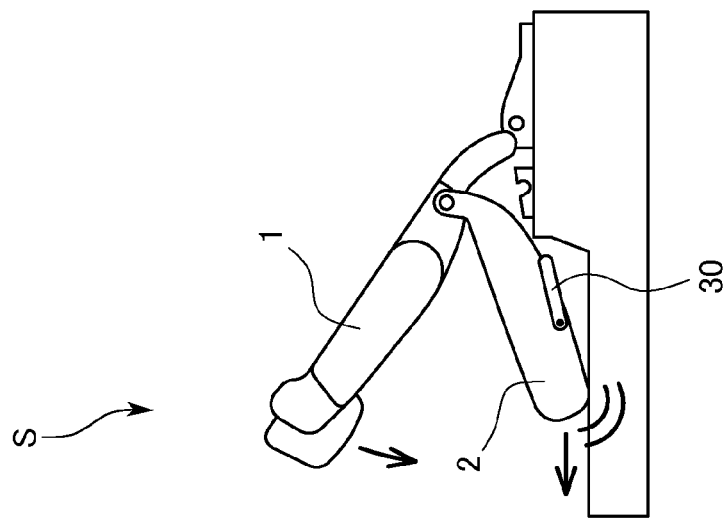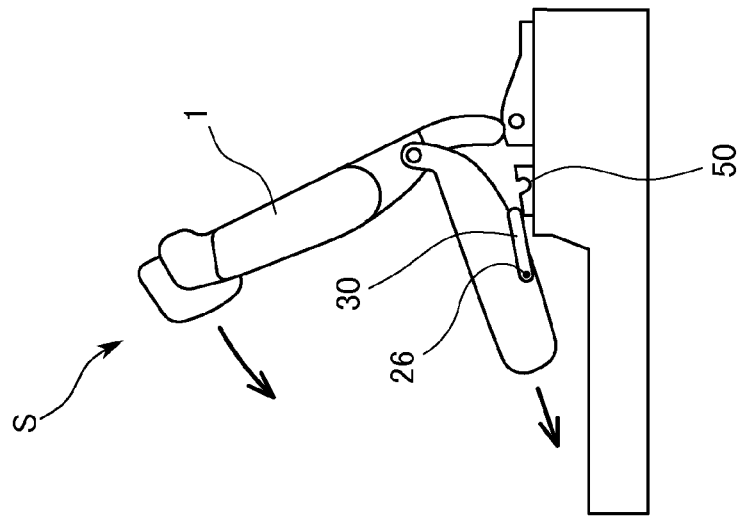

SEAT FOR VEHICLES

CROSS REFERENCE TO RELATED APPLICATIONS

This application is a National Stage Entry application of PCT Application No. PCT/JP2014/057330, filed Mar. 18, 2014, which claims the priority benefit of Japanese Patent Application No. 2013-084288, filed Apr. 12, 2013, and Japanese Patent Application No. 2013-084289, filed Apr. 12, 2013, the contents of all being incorporated herein by reference.

BACKGROUND

Disclosed herein is a vehicle seat, and particularly a vehicle seat which can retract a seat back and a seat cushion in a refraction floor formed in a position lower than a vehicle body floor.

Conventionally, vehicle seats have been known in which a seat cushion and a seat back that configure a seat body can be retracted in a refraction floor formed in a position lower than a vehicle body floor. Among those vehicle seats, there is a vehicle rear seat which is configured such that a seat body is tilted forward to be refracted in a refraction floor arranged at a front side of the seat.

A pivot link connecting between the seat body and the refraction floor and pivoting relative to the refraction floor is known as a mechanism which retracts the seat body. This pivot link pivots to thereby move a seat cushion to the refraction floor in a state where a seat back is folded onto the seat cushion (for example, see Japanese Patent Document No. H09-315189A ("the '189 Document")).

The seat described in the '189 Document includes a front leg link which is connected to a front portion of the seat cushion to pivot relative to the retraction floor and a rear leg link which is connected to a rear portion of the seat cushion to pivot relative to a vehicle body floor.

At the time of a retracting operation of the seat body, the seat back is folded toward the seat cushion and the front leg link is made to pivot forward of the seat about a pivot shaft which is arranged on the refraction floor; thereby, the seat body is configured to be retracted in the retraction floor.

In addition, slide rails are fixed to the retraction floor and the vehicle body floor, respectively, and the seat body is configured to be movable relative to the slide rails in a front to back direction of the seat.

Further, a vehicle seat described in Japanese Patent Document No. 2009-067309A ("the '309 Document") is provided with a refraction structure including: an attachment shaft which is attached to a vehicle body floor to support a seat back so that the seat back pivots; and a retractable leg member which is pivotally supported by a retaining groove fixed on a retraction floor and which supports a front portion of a seat cushion.

At the time of a retracting operation of a seat body, the seat back pivots relative to the vehicle body floor to move the seat cushion to the retraction floor and the retractable leg member pivots about the retaining groove in conjunction with the seat back; thereby, the seat body is configured to be refracted in the refraction floor.

In addition, the retractable leg member is detached from the retaining groove; thereafter, the vehicle seat can shift from a seated state where an occupant can be seated to a tip-up state where the seat cushion is tipped up.

However, the seat that can retract the seat body in the refraction floor as in the '189 Document is provided with a complicated refraction structure in order to retract the seat body in a such a way that components such as the pivot link for pivoting the seat body, the slide rails for sliding the seat body in the front to back direction, and a lock member for locking the seat body after the seat body is refracted are attached not only to a surface of the vehicle body floor at which the seat body is arranged, but also to a surface of the refraction floor.

Therefore, a vehicle seat which can be retracted in a retraction floor by a simple structure is desired.

Further, in the seat as in the '189 Document, the components of the refraction structure are attached to the surface of the retraction floor; therefore, space-saving ability of the surface of the refraction floor is deteriorated.

In particular, in a vehicle seat which can shift from a seated state where an occupant can be seated not only to a refracted state where a seat body is retracted but also to a tip-up state where the seat body is tipped up, a refraction space may narrow when the vehicle seat is in the tip-up state.

Therefore, a vehicle seat which can secure a large retraction space without the arrangement of components of a refraction structure on a surface of a retraction floor is desired.

Furthermore, the seat as in the '309 Document, the leg member supporting the seat cushion is connected between the seat cushion and the retraction floor, therefore being an elongated member.

Thus, in the event of shifting the seat body between the seated state and the tip-up state, an operation to detach the leg member from the retaining groove or fit the leg member into the retaining groove is required. However, an entire length of the leg member is long and therefore a pivotal range thereof in a front to back direction increases. As a result, the operation to fit the leg member into the retaining groove is difficult.

Therefore, a vehicle seat which easily shifts from a seated state is desired.

SUMMARY

Various embodiments of the present invention are made in view of the above-mentioned problems, and the object thereof is to provide a vehicle seat which can retract a seat body in a retraction floor by a simple structure.

Further, another object is to provide a vehicle seat which can secure a large retraction space without the arrangement of components of a retraction structure on a surface of a refraction floor.

Furthermore, still another object is to provide a vehicle seat which easily shifts from a seated state.

The foregoing problems are solved by various embodiments of the vehicle seat described below, the vehicle seat that can retract a seat back, and a seat cushion, which is pivotally connected to the seat back, in a refraction floor formed in a position lower than a vehicle body floor, the vehicle seat including: a support leg detachably retained by a leg retaining member, which is arranged on the vehicle body floor, and supporting the seat cushion, the seat back being pivotally connected to the vehicle body floor and pivotal relative to the vehicle body floor to move the seat cushion to the refraction floor, the support leg being pivotal relative to the seat cushion in accordance with a pivotal movement of the seat back, the support leg detaching from the leg retaining member when the seat back has reached a predetermined pivoted position.

According to the above-mentioned configuration, the vehicle seat that can retract the seat back and the seat cushion, which configure a seat body, in the retraction floor formed in the position lower than the vehicle body floor may be provided by a simple structure with the support leg detachably retained by the leg retaining member, which is arranged on the vehicle body floor, and supporting the seat cushion.

Further, the support leg and the leg retaining member that serve as components of a retraction structure are attached to the vehicle body floor; thereby, the vehicle seat that can secure a large refraction space without the arrangement of the components on a surface of the refraction floor may be provided.

In such a case, preferably, the vehicle seat includes a support base connected to the vehicle body floor and supporting the seat back so that the seat back is pivotal, and the seat back can pivot relative to the support base to move the seat cushion to the refraction floor.

According to the above-mentioned configuration, the vehicle seat that can retract the seat body in the refraction floor may be provided by a simple structure with the support base supporting the seat back so that the seat back is pivotal and with the support leg.

Further, the support base serving as a component of the refraction structure is attached to the vehicle body floor; therefore, the large refraction space can be secured while the component is not arranged on the surface of the retraction floor.

In such a case, preferably, the support leg is positioned lower than the leg retaining member when the vehicle seat is in a refracted state where the seat back and the seat cushion are refracted in the refraction floor.

According to the above-mentioned configuration, the support leg supporting the seat cushion pivots relative to the seat cushion in accordance with the pivotal movement of the seat back and detaches from the leg retaining member when the seat back has reached the predetermined pivoted position. Thereafter, the support leg is refracted in the retraction floor arranged in the position lower than the leg retaining member; thereby, the compact retraction structure can be realized.

In such a case, preferably, the support leg includes a leg pivot shaft arranged at an upper end portion of the support leg and pivotally supported by the seat cushion, and the leg pivot shaft is arranged at a front side of the leg retaining member when the vehicle seat is in a seated state where an occupant can be seated.

According to the above-mentioned configuration, for example, the seat back pivots relative to the vehicle body floor to move the seat cushion to the refraction floor, and the support leg pivots relative to the seat cushion in accordance with the pivotal movement of the seat back and detaches from the leg retaining member when the seat back has reached the predetermined pivoted position. In such a case, the leg pivot shaft is arranged at the front side of the leg retaining member when the vehicle seat is in the seated state; thereby, the support leg easily detaches from the leg retaining member.

In such a case, preferably, the leg retaining member is arranged above a surface of the vehicle body floor.

As described above, the leg retaining member is arranged not on the surface of the refraction floor but above the surface of the vehicle body floor. As a result, an entire length of the support leg can be reduced. The shorter the entire length of the support leg is, the shorter a pivotal range of the support leg in a front to back direction is. Thus, the support leg is easily retained by the leg retaining member. Consequently, the seat that easily shifts from the seated state is obtained.

In such a case, preferably, the leg retaining member is arranged at a rear side of a stepped portion of the vehicle body floor, the stepped portion being connected to the retraction floor.

According to the above-mentioned configuration, the seat that can retract the seat body in the refraction floor is obtained by a simple structure while the components of the refraction structure are not arranged on the surface of the refraction floor.

In such a case, preferably, the seat back can pivot forward of the seat relative to the vehicle body floor to move the seat cushion to the refraction floor, and when the seat back has reached a predetermined pivoted position, a front end portion of the seat cushion is brought into contact with the surface of the retraction floor before the support leg makes contact with the surface of the retraction floor.

As described above, when the seat back has reached the predetermined pivoted position, the front end portion of the seat cushion is brought into contact with the surface of the refraction floor before the support leg makes contact with the surface of the refraction floor. Thus, in the event of retracting the seat body in the retraction floor which is formed at a front side of the seat, an interference of the support leg with the surface of the refraction floor can be inhibited and therefore the support leg can be prevented from being damaged.

In such a case, preferably, the vehicle seat is movable from a retracted state to a tip-up state where the seat back and the seat cushion are tipped up, the vehicle seat including: a reclining device connecting the seat back so that the seat back is pivotal relative to the vehicle body floor; and a cushion locking device connecting the seat cushion so that the seat cushion is pivotal relative to the seat back, wherein when the vehicle seat is in the tip-up state, the reclining device can shift to a locked state where a pivotal movement of the seat back is locked, and wherein when the vehicle seat is in the refracted state or the tip-up state, the cushion locking device can shift to a locked state where a pivotal movement of the seat cushion is locked.

According to the above-mentioned configuration, the vehicle seat movable from the refracted state to the tip-up state may be provided by a simple structure. Further, the vehicle seat may be provided in which the large refraction space can be secured while the components of the refraction structure are not arranged on the surface of the refraction floor when the seat is in the tip-up state.

In such a case, preferably, the vehicle seat is movable from the tip-up state to a seated state where an occupant can be seated, wherein the cushion locking device includes a lock releasing section which releases the locked state of the cushion locking device when the vehicle seat is in the tip-up state, wherein the seat cushion pivots forward of the seat relative to the seat back in conjunction with an operation of the lock releasing section, and wherein when the seat cushion has reached a predetermined pivoted position, the support leg is retained by the leg retaining member to support the seat cushion in the seated state.

According to the above-mentioned configuration, the vehicle seat movable from the tip-up state to the seated state can be provided by a simple structure.

Further, in the configuration where when the seat cushion has reached the predetermined pivoted position, the support leg is retained by the leg retaining member to support the seat cushion in the seated state, the leg retaining member is arranged not on the retraction floor but on the vehicle body floor. As a result, the entire length of the support leg can be reduced. The shorter the entire length of the support leg is, the shorter the pivotal range of the support leg in the front to back direction is. Thus, the support leg is easily retained by the leg retaining member. In addition, the seat as a whole is downsized.

The vehicle seat that can retract the seat body in the retraction floor formed in the position lower than the vehicle body floor may be provided by a simple structure.

Further, the vehicle seat that can secure the large retraction space without the arrangement of the components of the retraction structure on the surface of the refraction floor may be provided.

The support leg detaches from the leg retaining member, thereafter being retracted in the retraction floor arranged in the position lower than the leg retaining member. Therefore, the compact refraction structure can be realized.

The leg pivot shaft is arranged at the front side of the leg retaining member when the vehicle seat is in the seated state; thereby, the support leg easily detaches from the leg retaining member.

The leg retaining member is arranged not on the surface of the retraction floor but above the surface of the vehicle body floor. As a result, the entire length of the support leg can be reduced. The shorter the entire length of the support leg is, the shorter the pivotal range of the support leg in the front to back direction is. Thus, the support leg is easily retained by the leg retaining member. Consequently, the seat that easily shifts from the seated state is obtained.

The vehicle seat movable from the refracted state to the tip-up state can be provided by a simple structure.

The vehicle seat movable from the tip-up state to the seated state can be provided by a simple structure.

BRIEF DESCRIPTION OF DRAWINGS

Various embodiments of the invention are illustrated in the following drawings:

FIGS. 4A, B, & C are schematic side views of the vehicle seat, illustrating the operation moving to the refracted state;

DETAILED DESCRIPTION

Hereinafter, a vehicle seat according to an embodiment of the present invention will be described with reference to FIGS. 1 to 6B.

The embodiment relates to the invention of the vehicle seat that can retract a seat body in a refraction floor, the vehicle seat being characterized by a seat back pivoting relative to a support base, which is located on a vehicle body floor, to move a seat cushion to the refraction floor, and by a support leg pivoting relative to the seat cushion in conjunction with a pivotal movement of the seat back, the support leg detaching from a leg retaining member, which is located on the vehicle body floor, to move downward of the leg retaining member when the seat back has reached a predetermined pivoted position.

In addition, a side at which an occupant is seated with respect to the seat back of the vehicle seat is a front side of the seat.

A vehicle seat S of the embodiment is, for example, a rear seat corresponding to a backseat of a vehicle. Further, the vehicle seat S can be utilized as a middle seat which is at the second row of a vehicle equipped with a three-row seat in a front to back direction of the vehicle.

Figure 1:
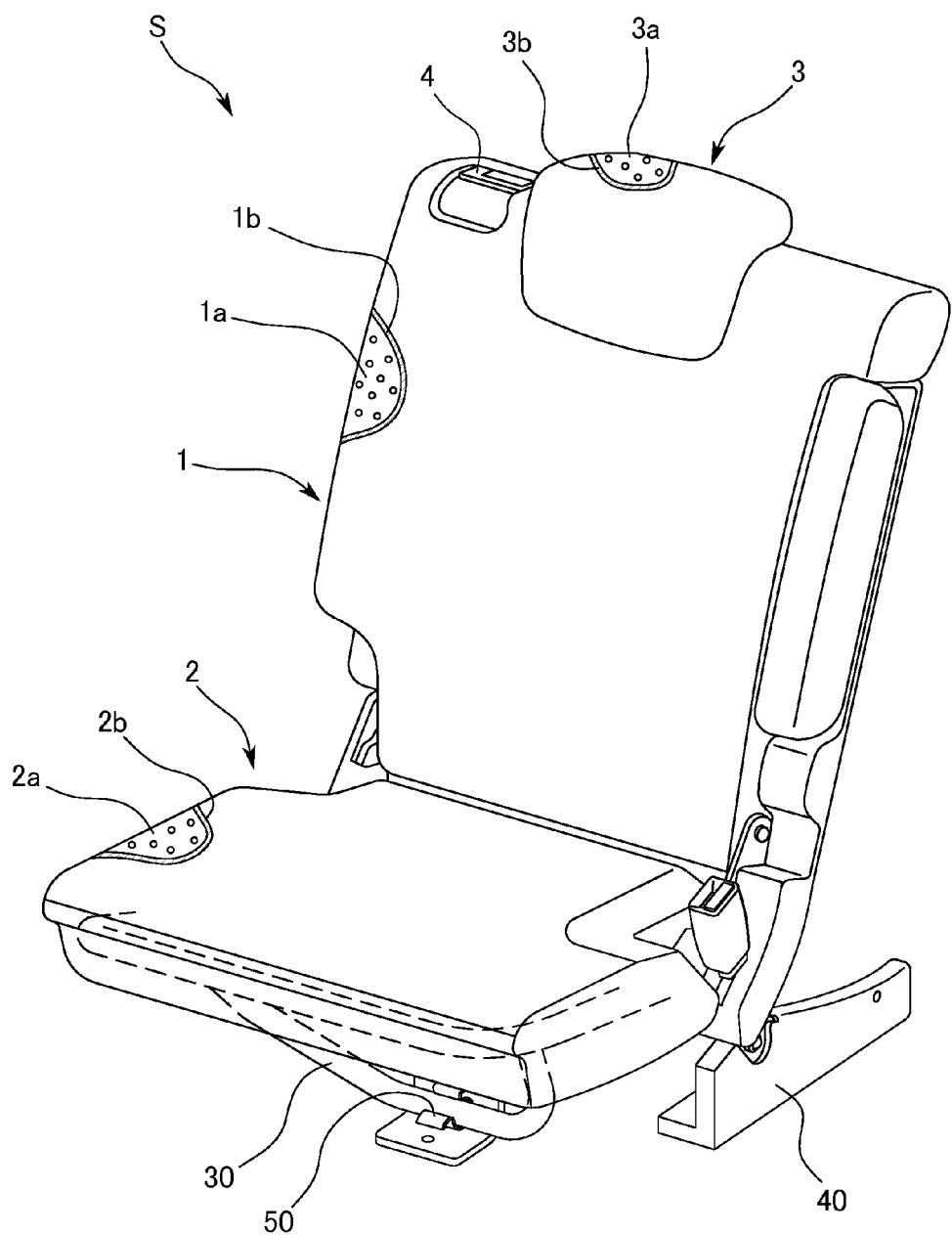
FIG. 1 is a schematic perspective view of a vehicle seat according to an embodiment of the present invention.

As shown in FIG. 1, the vehicle seat S mainly includes: a seat body equipped with a seat back 1, a seat cushion 2, and a headrest 3; a support leg 30 attached between the seat body and a vehicle body floor to support the seat cushion 2; support bases 40 supporting the seat back 1 so that the seat back 1 pivots; and a leg retaining member 50 attached to the vehicle body floor to support the support leg 30 so that the support leg 30 is detachable.

Figure 2:
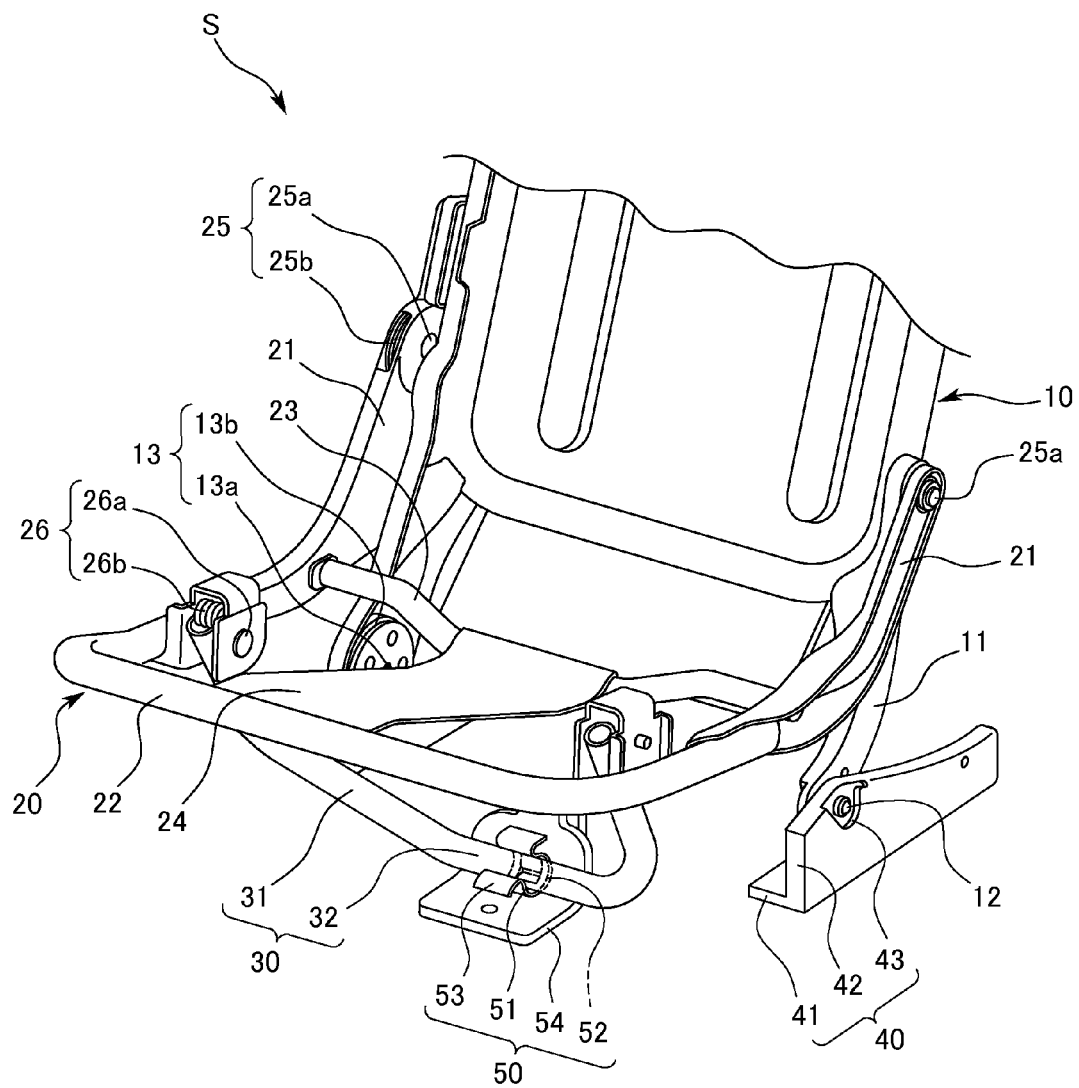
FIG. 2 is a schematic perspective view of a seat frame configuring a frame of the vehicle seat.

Further, as shown in FIG. 2, a reclining device 13 which connects the seat back 1 so that the seat back 1 pivots relative to the support bases 40 and cushion locking devices 25 which connect the seat cushion 2 so that the seat cushion 2 pivots relative to the seat back 1 are attached to the vehicle seat S.

As shown in FIGS. 4A-C, a recessed refraction floor formed in a position lower than the vehicle body floor is arranged at a front side of the vehicle seat S.

The vehicle seat S is a seat which can be arranged in three types of states: a seated state where an occupant can be seated; a refracted state where the seat body is retracted in the retraction floor; and a tip-up state where the seat body is tipped up.

Specifically, when the vehicle seat S is in the seated state, an operating lever 4 shown in FIG. 1 is pulled by an occupant. Therefore, the seat body tilts forward to be folded and the vehicle seat S shifts to the retracted state where the seat body is retracted in the retraction floor. Further, when the vehicle seat S is in the refracted state, the seat body is tilted up manually by the occupant. Therefore, the vehicle seat S shifts to the tip-up state. Furthermore, when the vehicle seat S is in the tip-up state, the support leg 30 functioning as an operating lever is pulled by the occupant; therefore, the seat cushion 2 pivots forward of the seat relative to the seat back 1 and the vehicle seat S returns to the seated state. The details will be described below.

As shown in FIG. 1, the seat back 1 is a backrest which supports the back of an occupant from behind, and it is configured such that a cushion pad 1a mounted on a back frame 10 shown in FIG. 2 and serving as a frame is covered by a surface material 1b.

The seat cushion 2 is a seating portion which supports an occupant from below, and it is configured such that a cushion pad 2a mounted on a cushion frame 20 shown in FIG. 2 and serving as a frame is covered from above by a surface material 2b.

The headrest 3 is a head portion which supports the head of an occupant from behind, and it is configured such that a cushion pad 3a mounted on a pillar (not shown) serving as a core material is covered by a surface material 3b.

The back frame 10 is formed by a frame body having a substantially rectangular shape and serving as the frame of the seat back 1. As shown in FIG. 2, right and left connecting brackets 11 for connecting the back frame 10 with the support bases 40 are attached to outer lateral surfaces of the back frame 10 in a right to left direction and at lower end portions of the back frame 10.

Each of the connecting brackets 11 is formed by a metallic plate member extending in an up to down direction and is formed in an approximately bow shape as seen from a lateral surface of the seat. An upper end portion of the connecting bracket 11 is connected to the back frame 10 and a lower end portion of the connecting bracket 11 is connected to the support base 40.

In addition, flange portions (not shown) bent inward in the right to left direction are formed at a front end portion and a rear end portion of the connecting bracket 11, thereby increasing the support strength for the back frame 10 and the support base 40.

The upper end portion of the connecting bracket 11 is arranged to be sandwiched between the back frame 10 and the cushion frame 20 in a right to left direction of the seat.

A back pivot shaft 12 pivotally supported via a pivot bolt (not shown) by the support base 40 in the right to left direction is arranged at the lower end portion of the left connecting bracket 11, and the reclining device 13 which connects the back frame 10 so that the back frame 10 pivots relative to the support base 40 is attached to the lower end portion of the right connecting bracket 11.

The reclining device 13 is formed by a publicly known reclining device. As shown in FIG. 2, the reclining device 13 is arranged at an inner lateral surface of the connecting bracket 11 in the right to left direction, thereby being inhibited from interfering with the cushion frame 20.

The reclining device 13 is mainly configured by a back pivot shaft 13a and a spiral spring 13b which biases the back frame 10 to a stand-up state.

The back pivot shaft 13a is pivotally supported by the back frame 10 and the support base 40 in the right to left direction, and one end portion of the spiral spring 13b is locked by the back frame 10 while the other end portion of the spiral spring 13b is locked by the support base 40.

The reclining device 13 can shift to a locked state where a pivotal movement of the back frame 10 is locked, and it locks the back frame 10 in the stand-up state. The operating lever 4 shown in FIG. 1 is operated; thereby, the reclining device 13 releases the locked state and allows the back frame 10 to pivot forward by a biasing force of the spiral spring 13b so that the back frame 10 can be folded toward the support base 40.

The cushion frame 20 is formed by a frame body having a substantially rectangular shape and serving as the frame of the seat cushion 2. As shown in FIG. 2, the cushion frame 20 mainly includes: right and left side frames 21 arranged at lateral sides in the right to left direction; a front connecting pipe 22 connecting front portions of the respective side frames 21; a center connecting pipe 23 connecting substantially center portions of the respective side frames in a front to back direction thereof; and a pan frame 24 serving as a plate-shaped frame connecting the front connecting pipe 22 and the center connecting pipe 23.

The side frame 21 is formed by a metallic plate member extending in the front to back direction. A front portion of the side frame 21 is connected to the front connecting pipe 22, and the cushion locking device 25 which connects the cushion frame 20 so that the cushion frame 20 pivots relative to the back frame 10 is attached to an upper end portion at a rear section of the side frame 21.

In addition, flange portions (not shown) bent outward in the right to left direction are formed at the upper end portion and a lower end portion of the side frame 21, thereby increasing the support strength for the front connecting pipe 22 and the support base 40.

The cushion locking device 25 is formed by a publicly known cushion locking device, and it includes a cushion pivot shaft 25a and a spiral spring 25b as shown in FIG. 2.

The cushion pivot shaft 25a is pivotally supported by the back frame 10 and the cushion frame 20 in the right to left direction. One end portion of the spiral spring 25b is locked by the back frame 10 while the other end portion of the spiral spring 25b is locked by the cushion frame 20.

The cushion locking device 25 can shift to a locked state where a pivotal movement of the cushion frame 20 is locked.

The cushion locking device 25 locks the pivotal movement of the cushion frame 20 when the seat body is retracted in the refraction floor as shown in FIG. 4, specifically, in a state where the back frame 10 is folded onto the cushion frame 20. In addition, when the support leg 30 functioning as the operating lever is pulled as shown in FIG. 6, the cushion locking device 25 releases the locked state and allows the cushion frame 20 to pivot forward relative to the back frame 10 by a biasing force of the spiral spring 25b.

The front connecting pipe 22 is formed by a pipe member having a substantially U-shape, and leg locking devices 26 which connect the support leg 30 so that the support leg 30 is pivotal relative to the cushion frame 20 are attached to inner lateral surfaces of the front connecting pipe 22 in the right to left direction.

As shown in FIG. 2, the leg locking device 26 includes a leg pivot shaft 26a and a spring member 26b. The leg pivot shaft 26a is pivotally supported by the front connecting pipe 22 and an upper end portion of the support leg 30 in the right to left direction. One end portion of the spring member 26b is locked by the cushion frame 20 while the other end portion of the spring member 26b is locked by the support leg 30.

The leg locking device 26 can shift to a locked state where a pivotal movement of the support leg 30 is locked. The leg locking device 26 locks the pivotal movement of the support leg 30 when the seat is in the retracted state, specifically, when the seat body is retracted in the retraction floor. In addition, the support leg 30 is pulled as shown in FIG. 6, therefore being released from the locked state. Accordingly, the support leg 30 can be moved by a biasing force of the spring member 26b to a position to be fitted into the leg retaining member 50 so that the seat returns to the seated state.

As shown in FIG. 2, the support leg 30 is a pipe member having a substantially U-shape for supporting the seat cushion 2, and it includes leg body portions 31 arranged at lateral sides in the right to left direction and a leg connecting portion 32 which connects lower end portions of the respective leg body portions 31.

Upper end portions of the leg body portions 31 are connected to inner lateral surfaces of the cushion frame 20 in the right to left direction and at substantially intermediate portions of the cushion frame 20 in the front to back direction. A substantially intermediate portion of the leg connecting portion 32 in the right to left direction is detachably retained by the leg retaining member 50.

The support base 40 is a member which supports the seat back 1. As shown in FIG. 2, the support base 40 is formed by a metallic plate member having a substantially L-shape elongated in the front to back direction. The support bases 40 are arranged at the lateral sides in the right to left direction to be connected to the vehicle body floor.

The support base 40 is mainly configured by a connecting wall portion 41 which is connected on an upper surface of the vehicle body floor and an outer wall portion 42 which is bent upward from an outer end portion of the connecting wall portion 41 in the right to left direction.

Further, a cut portion 43 is formed in a left-side portion of the outer wall portion 42, which faces the back pivot shaft 12 as viewed from the lateral surface of the seat; thereby, assembly is made easier in the event of tightening of the pivot bolt (not shown) from the lateral surface of the seat. The cut portion 43 is cut downward from an upper surface of the outer wall portion 42 to have a substantially semicircular shape.

The leg retaining member 50 is formed by a clip member having a substantially U-shape for retaining the support leg 30 so that the support leg 30 is detachable. As shown in FIG. 2, the leg retaining member 50 is configured by a pair of side wall portions 51 and a connecting wall portion 52 which connects lower end portions of the respective side wall portions 51. The leg retaining member 50 is attached on the vehicle body floor by a connecting bracket 54 having a curved shape.

The side wall portions 51 are respectively bent to come close to each other in a direction from the lower end to the upper end. In other words, the side wall portion 51 is bent inward of an opening portion of the leg retaining member 50 to reduce the opening portion, and a curled portion 53 curved outward of the opening portion is formed at the upper end of the side wall portion 51.

The connecting wall portion 52 is formed of a curved shape and is connected with the connecting bracket 54 along the curved portion thereof. Specifically, the connecting wall portion 52 is partially cut and raised therefrom to include a cut-and-raised portion (not shown). This cut-and-raised portion is retained by a retaining groove (not shown) formed at the curved portion of the connecting bracket 54; thereby, the connecting wall portion 52 is connected with the connecting bracket 54.

The leg retaining member 50 is supported by the connecting bracket 54 in a position to be inclined backward by a predetermined inclination angle relative to a horizontal surface. In other words, the leg retaining member 50 is supported by the connecting bracket 54 in the position in which the opening portion faces forward and obliquely upward.

The leg retaining member 50 is formed so that the width of the opening portion is slightly smaller than the width diameter of the support leg 30, and the leg retaining member 50 is elastically deformed to thereby retain the support leg 30 so that the support leg 30 is detachable.

Seat Retracting Operation

Next, an operation for moving the vehicle seat S from the seated state to the retracted state will be described on the basis of FIG. 3A through FIG. 4C.

Figure 3A:
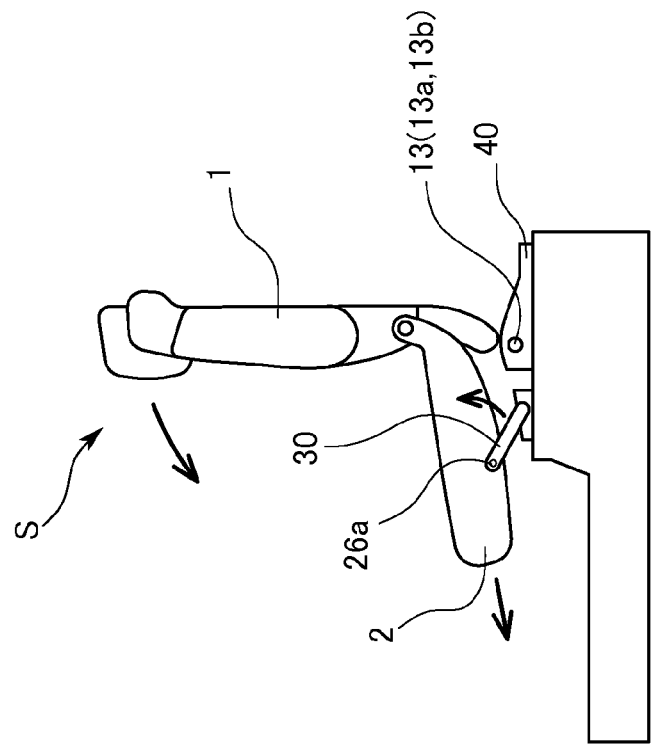
FIGS. 3A & B are schematic side views of the vehicle seat, illustrating an operation thereof moving from a seated state to a retracted state.

When the vehicle seat S is in the seated state shown in FIG. 3A, the seat back 1 is supported by the support base 40 and is locked in the stand-up state by the reclining device 13, and the seat cushion 2 is supported by the support leg 30 retained by the leg retaining member 50.

The leg pivot shaft 26a located at the upper end portion of the support leg 30 is arranged at the front side of the seat from the leg retaining member 50 when the seat is in the seated state.

In the event of moving the vehicle seat S from the seated state to the retracted state, for example, the operating lever 4 arranged at an upper surface of the seat back 1 is operated.

Figure 3B:
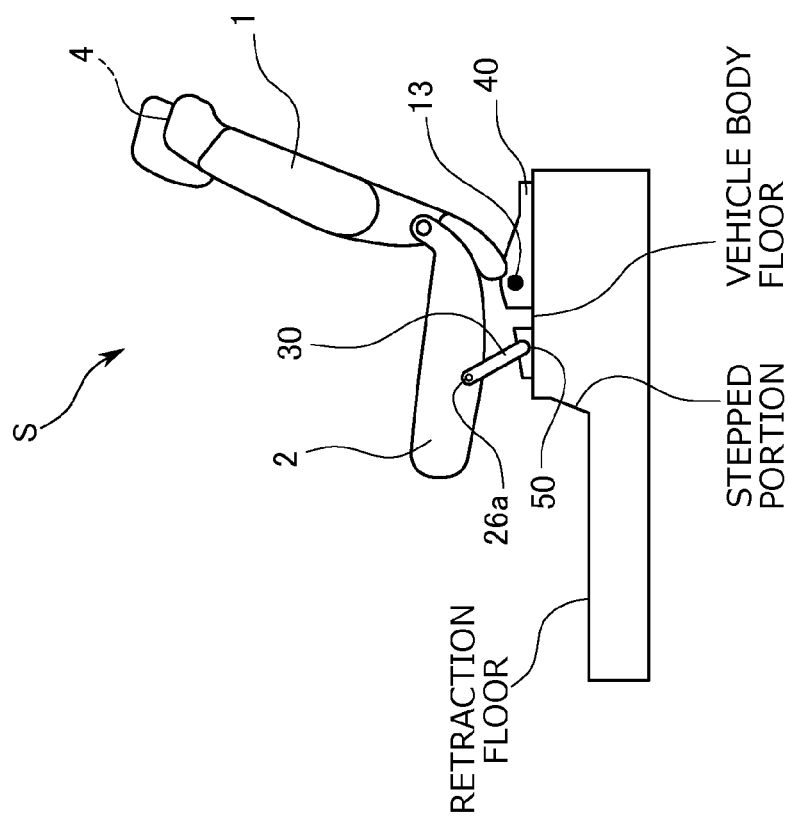

The operating lever 4 is operated by an occupant; thereby, as shown in FIG. 3B, the locked state of the reclining device 13 is released and the seat back 1 starts pivoting forward of the seat about the back pivot shaft 13a by a biasing force of the spiral spring 13b to move the seat cushion 2 to the refraction floor.

In accordance with the pivotal movement of the seat back 1, the support leg 30 starts pivoting rearward of the seat about the leg pivot shaft 26a relative to the seat cushion 2. At this time, the support leg 30 gets tight-supported between the seat cushion 2 and the vehicle body floor; therefore, the seat cushion 2 and the seat back 1 can be stably moved.

In addition, a publicly known cable (not show) is connected between the operating lever 4 and the reclining device 13, and the cable is pulled by the operation of the operating lever 4 to thereby release the locked state.

When the seat back 1 has reached a predetermined pivoted position as shown in FIG. 4A, the support leg 30 detaches from the leg retaining member 50. In other words, when the support leg 30 has reached the predetermined pivoted position in accordance with the pivotal movement of the seat back 1, the support leg 30 detaches from the leg retaining member 50.

At this time, the support leg 30 is locked by the leg locking device 26 while being folded toward the seat cushion 2.

Further, when the seat back 1 has reached a predetermined pivoted position as shown in FIG. 4B, the front end portion of the seat cushion 2 is brought into contact with a surface of the retraction floor before the support leg 30 makes contact with the surface of the retraction floor.

The seat cushion 2 slides forward of the seat on the surface of the refraction floor in accordance with the pivotal movement of the seat back 1.

According to a series of the above-mentioned operations, as shown in FIG. 4C, the seat body is refracted in the refraction floor and the vehicle seat S shifts to the refracted state.

The seat cushion 2 is locked by the cushion locking device 25 when the seat is in the refracted state, specifically, when the seat back 1 is folded onto the seat cushion 2.

The support leg 30 is disposed in a position lower than the leg retaining member 50 when the seat is in the retracted state.

Seat Tip-Up Operation

Next, an operation for moving the vehicle seat S from the retracted state to the tip-up state will be described on the basis of FIGS. 5A and B.

Figure 5A:
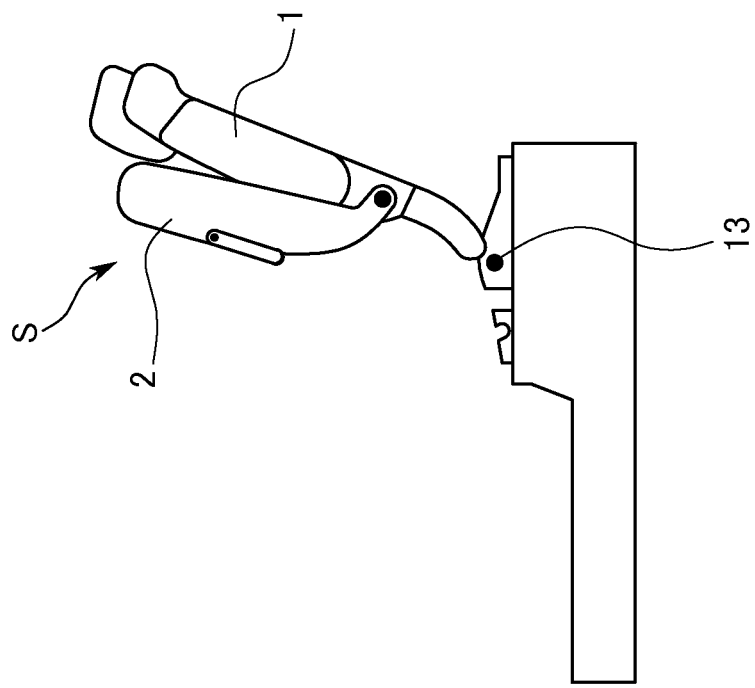
FIGS. 5A & B are schematic side views of the vehicle seat, illustrating an operation moving from the retracted state to a tip-up state.

When the vehicle seat S is in the retracted state shown in FIG. 5A, the seat body is tilted up manually by an occupant; therefore, the vehicle seat S shifts to the tip-up state.

At this time, the pivotal movement of the seat cushion 2 is locked by the cushion locking device 25. Accordingly, the seat back 1 is moved upward and thereby the seat cushion 2 can be integrally moved upward.

Figure 5B:
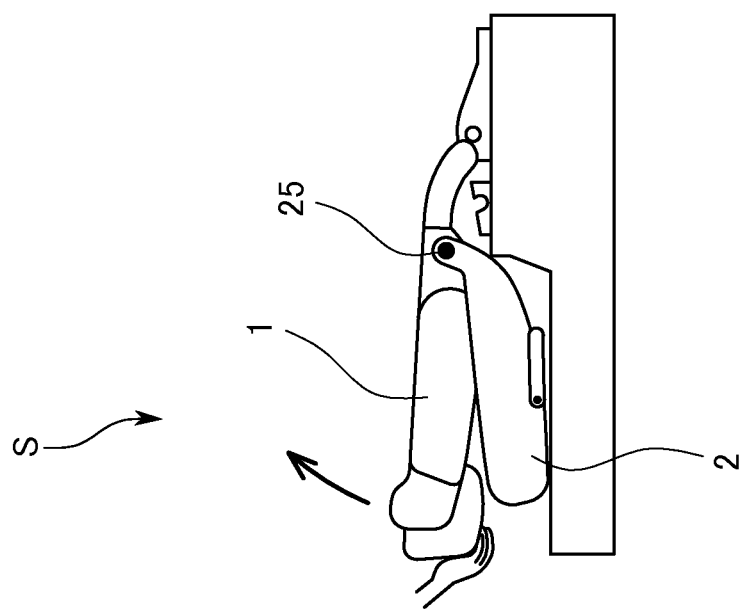

When the vehicle seat S is shifted to the tip-up state shown in FIG. 5B, the seat back 1 returns to the same position as when the seat is in the seated state, therefore being locked in the stand-up state by the reclining device 13.

Next, an operation for moving the vehicle seat S from the tip-up state to the seated state will be described on the basis of FIGS. 6A and B.

Figure 6A:
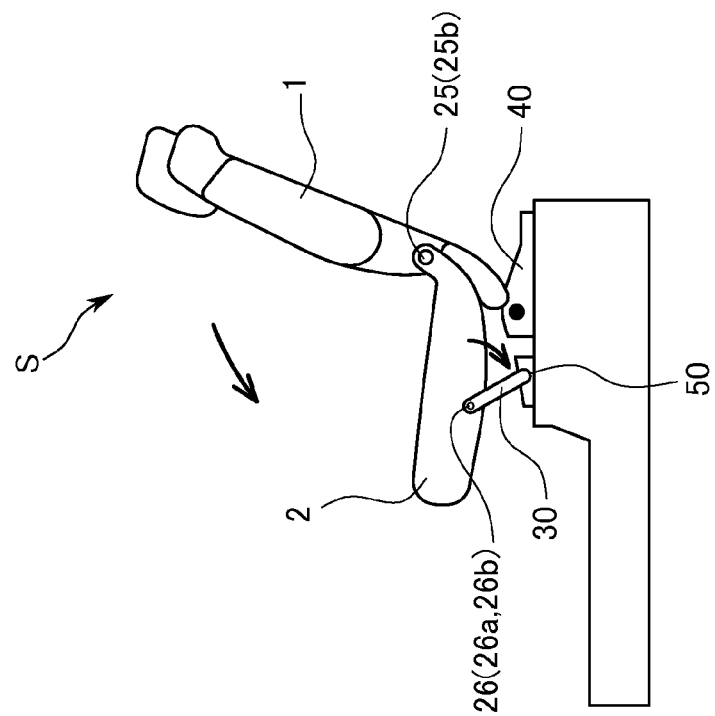
FIGS. 6A & B are schematic side views of the vehicle seat, illustrating an operation moving from the tip-up state to the seated state.

In the event of moving the vehicle seat S from the tip-up state to the seated state, the support leg 30 functioning, for example, as the operating lever is operated as shown in FIG. 6A.

The support leg 30 is pulled by an occupant to pivot upward about the leg pivot shaft 26a; thereby, the locked states of the cushion locking device 25 and the leg locking device 26 are released.

In addition, the operation to pull the support leg 30 corresponds to a releasing section in embodiments.

A publicly known cable is connected between the support leg 30 and the cushion locking device 25. The cable is pulled by the operation of the support leg 30; therefore, the locked states are released.

Figure 6B:
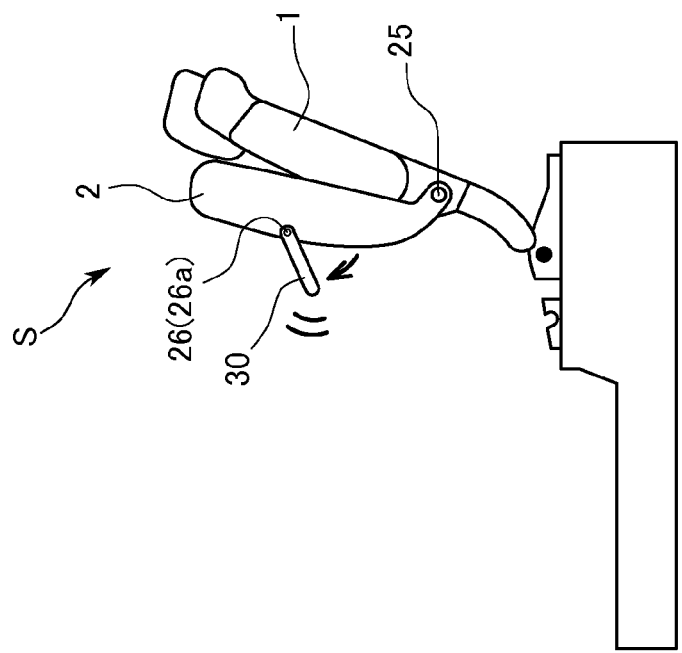

Along with the release of the cushion locking device 25 from the locked state, the seat cushion 2 pivots forward of the seat relative to the seat back 1 by the biasing force of the spiral spring 25b as shown in FIG. 6B.

Along with the release of the leg locking device 26 from the locked state, the support leg 30 pivots about the leg pivot shaft 26a by the biasing force of the spring member 26b to a position to be fittable into the leg retaining member 50.

Further, in accordance with the pivotal movement of the seat cushion 2, the support leg 30 pivots downward of the seat about the cushion pivot shaft 25a, therefore being fitted into the leg retaining member 50.

According to a series of the above-mentioned operations, the vehicle seat S returns to the seated state shown in FIG. 6B.

OTHER EMBODIMENTS

In the foregoing embodiment, the vehicle seat S is provided with the support bases 40 which support the seat back 1 so that the seat back 1 is pivotal, and each of the support bases 40 is configured to be attached between the seat body and the vehicle body floor, but not limited thereto. The support base 40 is eliminated and the seat back 1 may be configured to be pivotally connected directly to the vehicle body floor.

In the foregoing embodiment, as shown in FIG. 3, the leg retaining member 50 is arranged at a rear side of the seat from a stepped portion of the vehicle body floor, which is connected to the retraction floor.

Such configuration allows the support leg 30 retained by the leg retaining member 50 to be compactly arranged. Further, the support leg 30 is configured to support a substantially intermediate portion of the seat cushion 2 in the front to back direction; therefore, the support strength for the seat cushion 2 can be increased.

In addition, the vehicle body floor includes the stepped portion, but it does not include the retraction floor.

In the foregoing embodiment, when the seat is in the retracted state as shown in FIG. 4C, the cushion locking device 25 can shift to the locked state where the pivotal movement of the seat cushion 2 is locked, but not limited thereto. The cushion locking device 25 may be configured to shift to the locked state when the seat is in the tip-up state as shown in FIG. 5B.

In the foregoing embodiment, a retractable vehicle seat applied to an automobile is explained as a specific example, but it is not limited thereto. The vehicle seat described herein can be utilized as a vehicle seat for a train, a bus, or the like, or as a passenger seat for an airplane, a boat, or the like.

The foregoing embodiment is merely an example of the invention to facilitate understanding, and does not restrict the present invention. Certainly, the present invention may be changed or modified without departing from the scope of the invention and may include its equivalents.

In particular, the arrangement and configuration of the support leg 30, the support base 40, and the leg retaining member 50 that are described in the foregoing embodiment are merely examples and do not restrict the present invention.

REFERENCE SIGNS LIST

S: vehicle seat
1: seat back
1a, 2a, 3a: cushion pad
1b, 2b, 3b: surface material
2: seat cushion
3: headrest
4: operating lever
10: back frame
11: connecting bracket
12: back pivot shaft
13: reclining device
13a: back pivot shaft
13b: spiral spring
20: cushion frame
21: side frame
22: front connecting pipe
23: center connecting pipe
24: pan frame
25: cushion locking device
25a: cushion pivot shaft
25b: spiral spring
26: leg locking device
26a: leg pivot shaft
26b: spring member
30: support leg
31: leg body portion
32: leg connecting portion
40: support base
41: connecting wall portion
42: outer wall portion
43: cut portion
50: leg retaining member
51: side wall portion
52: connecting wall portion
53: curled portion
54: connecting bracket

The invention claimed is:

1. A vehicle seat which can be retracted in a retraction floor which is formed in a position lower than a vehicle body floor and which is positioned at a front side of the vehicle seat, the vehicle seat comprising:
 a seat back that is arranged on the vehicle body floor,
 a seat cushion that is pivotally connected to the seat back,
 a leg retaining member that is arranged on the vehicle body floor, and
 a support leg that is detachably retained by the leg retaining member and supports the seat cushion,
wherein:
 the seat back is pivotally connected to the vehicle body floor and pivotal in a forward direction relative to the vehicle body floor to move the seat cushion to the retraction floor,
 the support leg is pivotal relative to the seat cushion in accordance with a pivotal movement of the seat back,
 the support leg is detachable from the leg retaining member when the seat back pivots in the forward direction to move the seat cushion toward the retraction floor and when the seat back has reached a predetermined pivoted position, and a front end portion of the seat cushion is brought into contact with a surface of the retraction floor before the support leg makes contact with the surface of the retraction floor.

2. The vehicle seat according to claim 1, comprising:
a support base connected to the vehicle body floor and supporting the seat back so that the seat back is pivotal, wherein:
the seat back is pivotable relative to the support base to move the seat cushion to the retraction floor.

3. The vehicle seat according to claim 1, wherein the support leg is positioned lower than the leg retaining member when the vehicle seat is in a retracted state where the seat back and the seat cushion are retracted in the retraction floor.

4. The vehicle seat according to claim 1, wherein:
the support leg comprises a leg pivot shaft arranged at an upper end portion of the support leg and pivotally supported by the seat cushion, and
the leg pivot shaft is arranged at a front side of the leg retaining member when the vehicle seat is in a seated state where an occupant can be seated.

5. The vehicle seat according to claim 1, wherein the leg retaining member is arranged above a surface of the vehicle body floor.

6. The vehicle seat according to claim 1, wherein the leg retaining member is arranged at a rear side of a stepped portion of the vehicle body floor, the stepped portion being connected to the retraction floor.

7. The vehicle seat according to claim 1, wherein:
when the seat back has reached a predetermined pivoted position, a front end portion of the seat cushion is brought into contact with a surface of the retraction floor before the support leg makes contact with the surface of the retraction floor.

8. The vehicle seat according to claim 1, the vehicle seat being movable from a retracted state to a tip-up state where the seat back and the seat cushion are tipped up, the vehicle seat comprising:
a reclining device connecting the seat back so that the seat back is pivotal relative to the vehicle body floor; and
a cushion locking device connecting the seat cushion so that the seat cushion is pivotal relative to the seat back, wherein:
when the vehicle seat is in the tip-up state, the reclining device can shift to a locked state where a pivotal movement of the seat back is locked, and
when the vehicle seat is in the retracted state or the tip-up state, the cushion locking device can shift to a locked state where a pivotal movement of the seat cushion is locked.

9. The vehicle seat according to claim 8, the vehicle seat being movable from the tip-up state to a seated state where an occupant can be seated, wherein:
the cushion locking device comprises a lock releasing section which releases the locked state of the cushion locking device when the vehicle seat is in the tip-up state,
the seat cushion pivots in the forward direction relative to the seat back in conjunction with an operation of the lock releasing section, and
when the seat cushion has reached a predetermined pivoted position, the support leg is retained by the leg retaining member to support the seat cushion in the seated state.

* * * * *